(12) United States Patent
Emery

(10) Patent No.: US 8,842,037 B2
(45) Date of Patent: Sep. 23, 2014

(54) HIGH FREQUENCY SURFACEWAVE RADAR

(75) Inventor: David James Emery, Brentwood (GB)

(73) Assignee: BAE Systems plc, London (GB)

(*) Notice: Subject to any disclaimer, the term of this patent is extended or adjusted under 35 U.S.C. 154(b) by 0 days.

(21) Appl. No.: 13/139,442

(22) PCT Filed: Dec. 1, 2009

(86) PCT No.: PCT/GB2009/051626
§ 371 (c)(1),
(2), (4) Date: Jun. 13, 2011

(87) PCT Pub. No.: WO2010/067095
PCT Pub. Date: Jun. 17, 2010

(65) Prior Publication Data
US 2011/0241929 A1    Oct. 6, 2011

(30) Foreign Application Priority Data

Dec. 12, 2008  (EP) .................................. 08253998
Dec. 12, 2008  (GB) ................................. 0822631.8

(51) Int. Cl.
*G01S 13/58* (2006.01)
*G01S 13/02* (2006.01)
*G01S 7/41* (2006.01)
*G01S 13/538* (2006.01)

(52) U.S. Cl.
CPC ........... *G01S 13/0218* (2013.01); *G01S 13/589* (2013.01); *G01S 7/415* (2013.01); *G01S 13/588* (2013.01); *G01S 13/538* (2013.01)
USPC ............................ 342/105; 342/104; 342/108

(58) Field of Classification Search
CPC ... G01S 13/726; G01S 7/414; G01S 13/0218; G01S 13/588; G01S 13/589
USPC .................. 342/104, 107–109, 114, 159, 160
See application file for complete search history.

(56) References Cited

U.S. PATENT DOCUMENTS 6,121,919 A * 9/2000 Ameen et al. ................. 342/174
7,545,312 B2 * 6/2009 Kiang et al. ................. 342/109
7,626,535 B2 * 12/2009 Ding et al. ...................... 342/95

(Continued)

FOREIGN PATENT DOCUMENTS

EP   1 580 573 A1   9/2005
GB   2 387 053 A    10/2003

OTHER PUBLICATIONS

Butler, M.M. et al., Feasibility of Mitigating the Effects of Windfarms on Primary Radar, ETSU W/14/—623/REP DTI PUB URN No. 03/976, 2003, XP007908306.

(Continued)

*Primary Examiner* — John B Sotomayor
*Assistant Examiner* — Marcus Windrich
(74) *Attorney, Agent, or Firm* — Scully, Scott, Murphy & Presser, PC

(57) ABSTRACT

A process for reducing erroneous plots when detecting targets using High Frequency surfacewave radar (HFSWR) is provided. Detection of genuine targets is thereby enhanced. A first difference in range of an apparent target is determined, based on range data, associated with the apparent target. A second difference in range of the apparent target is determined, based on Doppler data, associated with the apparent target. The first and second range differences are compared to one another over time to assess a consistency therebetween.

11 Claims, 4 Drawing Sheets

(56) References Cited

U.S. PATENT DOCUMENTS

| | | | |
|---|---|---|---|
| 2002/0171586 A1* | 11/2002 | Martorana et al. | 342/458 |
| 2003/0142011 A1* | 7/2003 | Abramovich et al. | 342/159 |
| 2003/0174088 A1* | 9/2003 | Dizaji et al. | 342/93 |
| 2004/0150552 A1* | 8/2004 | Barbella et al. | 342/109 |
| 2005/0285774 A1* | 12/2005 | Wittenberg et al. | 342/70 |
| 2007/0293331 A1* | 12/2007 | Tuxen | 473/199 |
| 2008/0111730 A1* | 5/2008 | Ding et al. | 342/90 |
| 2008/0111731 A1* | 5/2008 | Hubbard et al. | 342/160 |
| 2010/0265122 A1* | 10/2010 | Oswald | 342/136 |
| 2011/0241928 A1* | 10/2011 | Oswald et al. | 342/90 |

OTHER PUBLICATIONS

International Preliminary Report on Patentability together with the Written Opinion from PCT/GB2009/051626 dated Jun. 23, 2011.

Matthews J.C.G. et al., "Interaction Between Radar Systems and Wind Farms", *2008 Loughborough Antennas & Propagation Conference* pp. 461-464 (Mar. 17-18, 2008).

Riddolls R.J., "Effects of Wind Turbines on High Frequency Surface Wave Radar", *Internet Citation, Section 3*, XP009114924 (Dec. 1, 2005).

Royal Air Force-Air Warfare Centre, "The Effects of Wind Turbine Farms on Air Defence Radars", *Internet Citation [Online]*, *vol. AWC/WAD/72/652/TRIALS*, 32 pages, XP009114914 (Jan. 6, 2005).

Lees M.L. et al., "An Overview of Signal Processing for an Over-the-Horizon Radar", *Proceedings of the lasted International Conference Signal and Image Processing, vol. 1*, pp. 491-494, XP009114827 (Jan. 1, 1987).

Ralph A.P., "Data Processing for a Groundwave HF Radar", *THE GEC Journal of Research*, vol. 6(2), pp. 96-105, XP000065320 (Jan. 1, 1988).

Money D.G. et al., "HF Surface Wave Radar Management Techniques Applied to Surface Craft Detection", *The Record of the IEEE 2000 International Radar* Conference, pp. 110-115, XP001175444 (May 7-12, 2000).

GB Search Report dated Mar. 23, 2009 from related GB Application No. GB0822631.8.

International Search Report dated Mar. 9, 2010 received from the European Patent Office from related International Application No. PCT/GB2009/051626.

European Search Report dated May 6, 2009 from related European Application No. 08253998.2.

* cited by examiner

HIGH FREQUENCY SURFACEWAVE RADAR

The present invention relates to High Frequency surfacewave radar installations, in particular to a method for eliminating the impact of wind farms on the operation of such installations.

As the energy generation sector continues to grow in a market where environmental issues are of increasing concern, there is an increased tendency to develop and use renewable forms of energy such as harnessing tidal energy and wind energy. Consequently, the number of wind farm installations is rapidly increasing.

Wind turbines represent large structures with components such as rotor blades, being of significant magnitude. Tip portions of such rotor blades move at significant speeds which may be comparable to potential targets that can be found within a surveillance area. The impact of wind turbines on radar surveillance can be seen across different radar frequency ranges.

The impact of wind turbines to High Frequency (HF) radar is somewhat different to that experienced at microwave frequencies but is, nevertheless, problematic. The surveillance area of a High Frequency surface wave radar (HFSWR) installation is, typically, located over the sea and so it is offshore wind farms that are of particular concern in this field of technology.

Wave lengths in the High Frequency range are typically 10 to 100 meters and signals in the HF range are used to detect targets at significant distances from the radar installation. In detecting a target at roughly 150 kilometers using HFSWR large error tolerances are experienced in both range (±1 to 2 km) and azimuth (±1°) due to limited band width availability and physical antenna size constraints. Predicting location of a target using HFSWR is, therefore, inaccurate and this lack of accuracy conventionally makes it difficult to distinguish a detected wind turbine or farm from a genuine moving target.

It is, therefore, desirable to develop a method of detecting wind turbines/farms so that they can be eliminated from the surveillance area to, thereby, improve detection of genuine targets.

According to a first aspect the present invention provides a process for reducing erroneous plots when detecting targets using High Frequency surfacewave radar (HFSWR) and thereby enhancing detection of genuine targets, the process comprising the steps of:

determining a first difference in range of an apparent target based on range data, associated with the apparent target;

determining a second difference in range of the apparent target based on Doppler data, associated with the apparent target; and comparing the first and second range differences to one another over time to assess a consistency therebetween.

By independently determining first and second differences in range, from a first time to a second time, based on range data and Doppler data respectively, a consistency between the two can be ascertained. In this way, false targets displaying ostensible velocity characteristics whilst not moving anywhere or apparently moving incongruously can be distinguished from genuine targets having consistent velocity and range characteristics.

The erroneous plots may emanate from a lone wind turbine or from a wind farm comprising a number of wind turbines.

The comparing step may be performed over a plurality of time periods, the time periods may be consecutive time periods, say four to twenty time periods. The time periods may be coherent integration times (CIT).

The comparing step may comprise normalising a difference between the first and second differences in range to yield a range consistency parameter. The range consistency parameter may be compared to a threshold value to evaluate the range consistency of the apparent target.

The apparent target may be discarded if the range consistency parameter is 4 or more and the apparent target may be considered to be a genuine target if the range consistency parameter is 2 or less.

The present invention will now be described in greater detail, by way of example only, with reference to the accompanying drawings, in which.

Pulses are transmitted from a radar antenna at a particular rate, for example a signal may comprise 500 pulses per second, i.e. a signal having a pulse repetition frequency (PRF) of 500 Hz. The signal is transmitted, received and processed for a set period of time, the coherent integration time (CIT), for ships this could be several minutes, say 200s. At the end of the CIT all of the information from the return signal from each of these pulses is integrated to enable a Doppler spectrum to be plotted at a particular time, say M for a particular range and azimuth. A single example Doppler spectrum is illustrated in FIG. 1, however, in practice an array of such traces is established each relating to a single range azimuth cell within the radar surveillance area.

The example trace clearly comprises a number of peaks, each of which may represent a potential target. Conventional threshold techniques are applied to such traces to enable potential targets to be identified. Information that can be extracted in relation to each peak comprises range, azimuth, Doppler (i.e. the radial component of a velocity vector) and signal strength.

Figure 1:
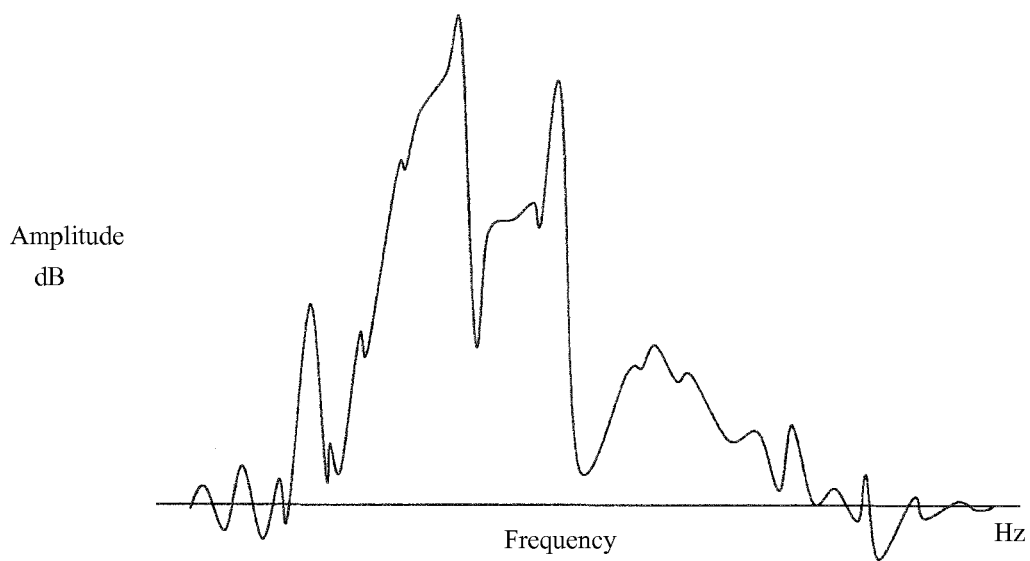
FIG. 1 illustrates a Doppler spectrum for a single range-azimuth cell.
Figure 2:
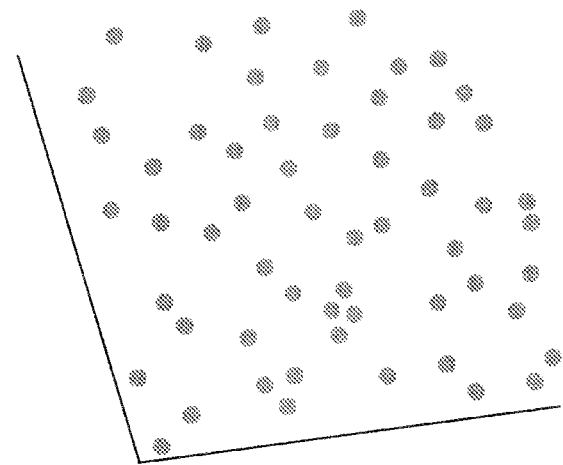
FIG. 2 illustrates geographical plot display of a surveillance area at a time, M.

Plot extraction techniques are used with traces of the type shown in FIG. 1, to result in a filtered set of results which are geographically displayed in FIG. 2. The plot extraction technique identifies many points in the surveillance area that may represent potential targets at the time M, each such "point" is referred to as a "plot". Each plot is identified as a result of an accumulation and rationalisation of data from a number of overlapping cells which, when combined, represent the totality of the surveillance area. Whilst a number of potential targets are schematically represented in FIG. 2, such a diagram may, typically, comprise in the region of 1000 potential targets or plots, a high proportion of which are false alarms.

In HF radar, simplistic threshold techniques can result in many targets being discarded as the clutter and external noise/interference may dominate the genuine signals. Consequently, thresholds are set low such that plot extraction techniques, if used alone, result in many false alarms.

Figure 3:
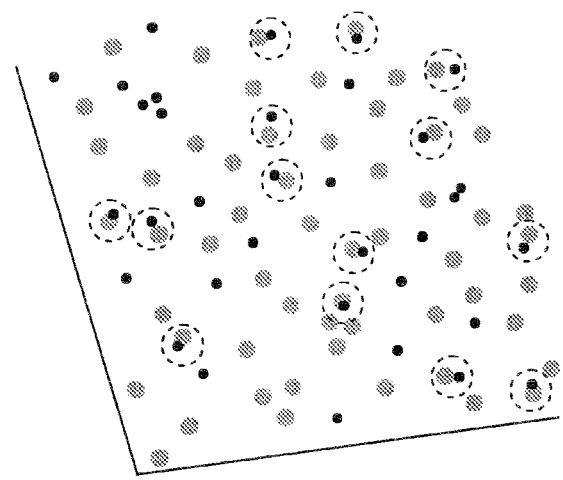
FIG. 3 illustrates the display of FIG. 2 with additional plot data from a second time, N.

Tracking techniques repeat the plot extraction process over time. For example, at the end of a subsequent time interval (CIT) say N, a further plot extraction step may be performed and the plots may be superposed as shown in FIG. 3. Some potential targets identified at time M are clearly not identified at time N and so these potential targets or plots are not reinforced and can, therefore, be discarded as representing false alarms in the previous diagram.

The remaining plots (represented by a dashed line in FIG. 3) that comprise a potential target at time N, each of which is substantially co-located with a potential target identified at time M, fall within a number of categories:

1) a genuine target
2) a static object such as a wind turbine having moving rotors and, therefore, a Doppler output
3) a static object with no moving parts and, therefore, no Doppler output
4) multiple incidences of clutter which, by coincidence, happen to be located at substantially the same place.

The location of each potential target identified is represented by a nominal range and azimuth. However, error tolerances experienced in radar at the High Frequency range in particular are significant. For example, a target located at a distance of approximately 150 kilometers may show inaccuracies of approximately ±1 to 2 kilometers in range and approximately ±1° in azimuth. Consequently, a static target such as a wind turbine may, in one geographic display appear in one place and in a second display the same static target could appear to be up to two kilometers away at a different azimuth location. As such, the turbine could be considered to be a moving target, moving from a first erroneous location to a second erroneous location each location being covered by the not insubstantial error tolerance. Conversely, even if the range of an apparent target at time N is shown to be the same as at a previous time, M, the known error could mean that the target is 1-2 km away from the original location from the previous update. Hence, a genuine target could give the impression of representing a static, false, target.

Figure 4:
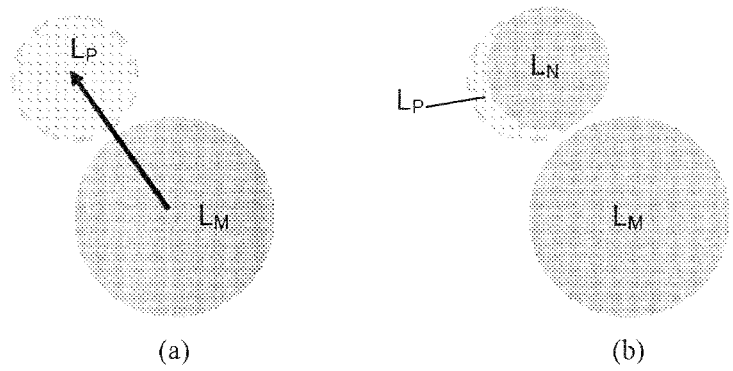
FIG. 4 represents prediction and comparison of a particular plot from time M to time N.
Figure 5:
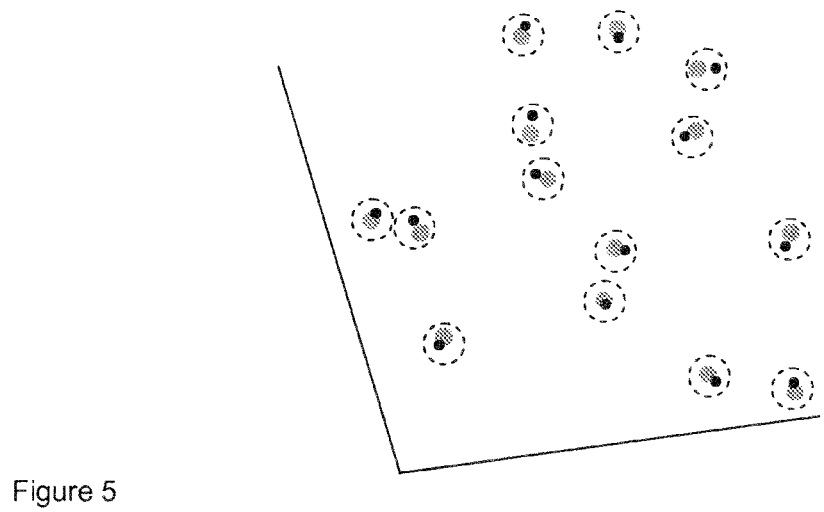
FIG. 5 illustrates the geographical plot display of FIG. 3 showing only the tentative tracks.

When each potential target is identified at an initial time, M, certain information can be ascertained from the original return data. This information includes range, azimuth, Doppler (radial component of velocity vector) and signal strength data from which, the current location $L_M$ and a predicted position $L_P$ for the apparent target at a subsequent time N can be established as illustrated in FIG. 4a. Once an array of Doppler spectra (at time N) has been established, potential targets identified from the latter array at locations $L_N$ can be compared to the predicted locations $L_P$ of each apparent target from the earlier information (time M) as illustrated in FIG. 4b. If a second target is not identified at the predicted location $L_P$ (or within a tolerance thereof) the apparent target can be discarded. The remaining apparent targets are referred to as "tentative tracks". FIG. 5 represents a geographic display showing only these tentative tracks.

The prediction and comparing technique is carried out by a standard model, for example by a Kalman filter. Conventionally, such a model is applied across two consecutive CIT.

Doppler readings from a wind turbine are due to the motion of the rotor blades, and are particularly notable when such motion is oriented directly towards or away from the radar installation. Consequently, the possibility of a genuine moving target is suggested. Prediction techniques estimate potential locations that the apparent target should move to. Over a number of intervals, given the Doppler radial velocity component, it becomes clear that the apparent target does not follow an anticipated, realistic trajectory.

Figure 6:
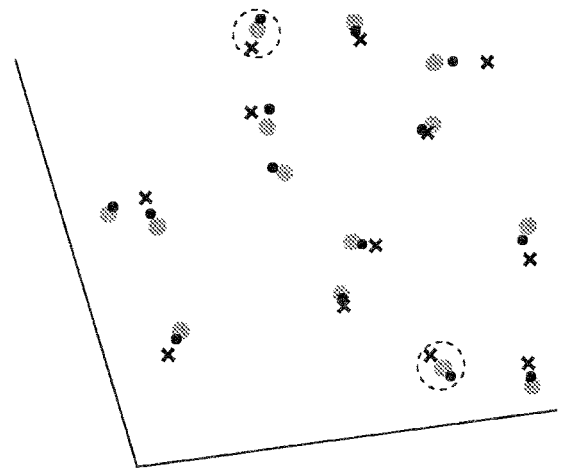
FIG. 6 illustrates the display of FIG. 2 with additional plot data from a third time, Q.

Indeed, over a sufficiently long period of time, say 30 minutes, it becomes clear that some targets apparently vacillate about a particular location rather than travelling a distance consistent with the Doppler reading. Such vacillatory behaviour is not typical of any genuine target and can, therefore, ultimately be identified as being false. FIG. 6 represents a further diagram where "x" represents plots identified at a later time, Q. The dashed circles illustrate two locations that may represent wind farms as the subsequently plotted apparent targets do not display consistent trajectory data.

Additional rules, constraints and/or filters can be implemented to automatically identify such characteristics so that false targets can be discarded without operator intervention. Wind turbines cannot be detected from one "update" to the next as the error bounds overlap to an extent whereby the potential target could easily be genuine. A longer timescale range consistency check is, therefore, required.

The change in range of an apparent target can be calculated in two different ways. Firstly, the range of the target can be directly ascertained from the return data at each time, say $R_M$ and $R_N$, and a difference therebetween can be ascertained:

$$R_1 = R_N - R_M$$

Secondly, the radial velocity $\dot{r}$ (identified by the Doppler reading) can be integrated across the time interval, from M to N, to result in a change in range of the apparent target from one interval to the next:

$$R_2 = t_{update} \cdot \sum_{i=M}^{N} \dot{r}_i$$

An error, $\sigma$, associated with each change in range $R_1$ and $R_2$ can be determined.

$$\sigma_{R_1} = \sqrt{\sigma_{R_N}^2 + \sigma_{R_M}^2}$$

$$\sigma_{R_2} = \sqrt{(N-M) \cdot \overline{\sigma}_{\dot{r}}^2 \cdot t_{update}^2}$$

$$\sigma_{R_2} = \sqrt{(N-M)} \cdot \overline{\sigma}_{\dot{r}} \cdot t_{update}$$

where $\overline{\sigma}_{\dot{r}}$ is the mean standard deviation of the range rate measurement over the (N−M) measurements and $t_{update}$ is the time between updates.

The two estimates of the change in range can be compared $$S = |R_1 - R_2|$$

The magnitude of this difference value, S, can be normalised by the standard deviation, resulting in a range consistency parameter, D $$D = \frac{S}{\sqrt{\sigma_{R_1}^2 + \sigma_{R_2}^2}}$$

Figure 7:
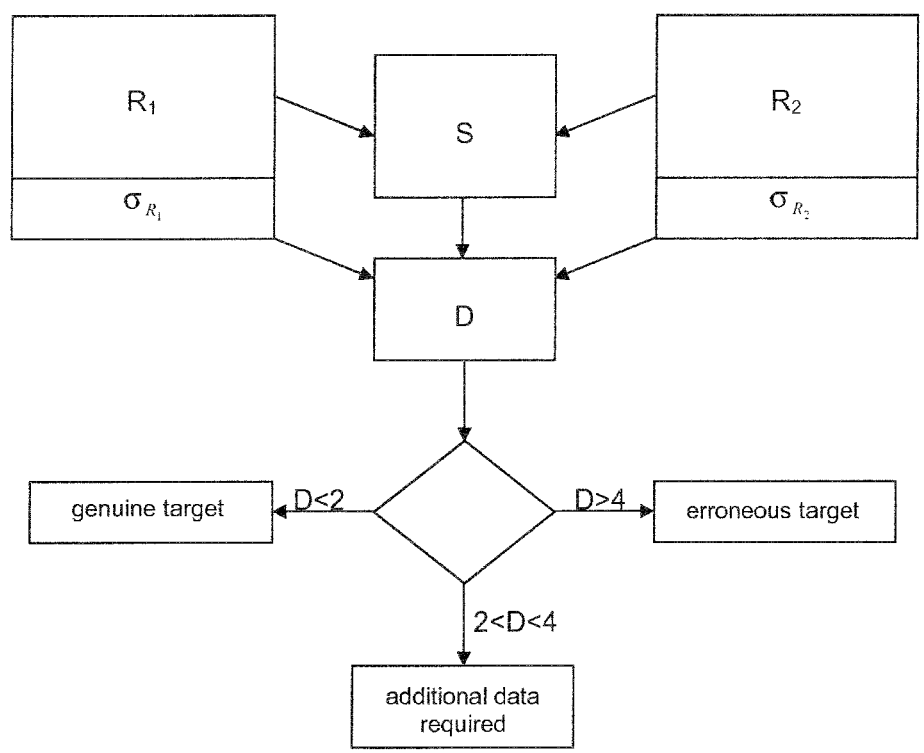
FIG. 7 is a flow diagram representing a process for reducing erroneous plots.

The range consistency parameter, D, can be used to verify the range consistency of the track. If consistency is established then it can be assumed that the phenomenon being tracked is a genuine target. A flow diagram representing this process is illustrated in FIG. 7.

Figure 8:
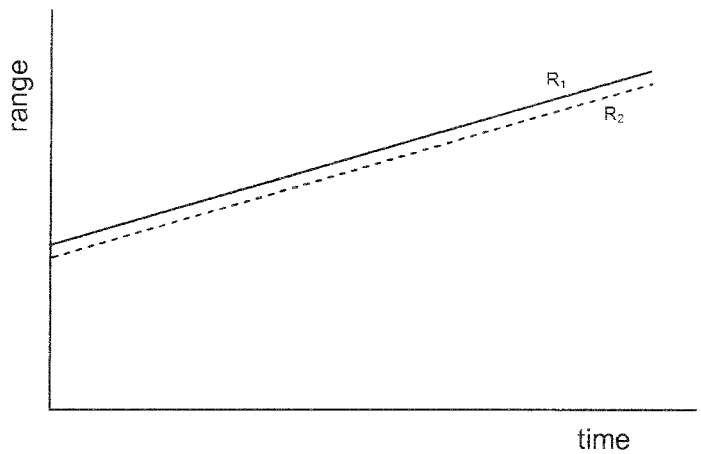
FIG. 8 illustrates a range consistency diagram for a genuine target.

FIG. 8 illustrates a schematic representation of a track of a genuine target. The two measures of change in range $R_1$ and $R_2$ vary substantially in line with one another as that derived from the Doppler is consistent with that derived directly from the range measurement.

Figure 9:
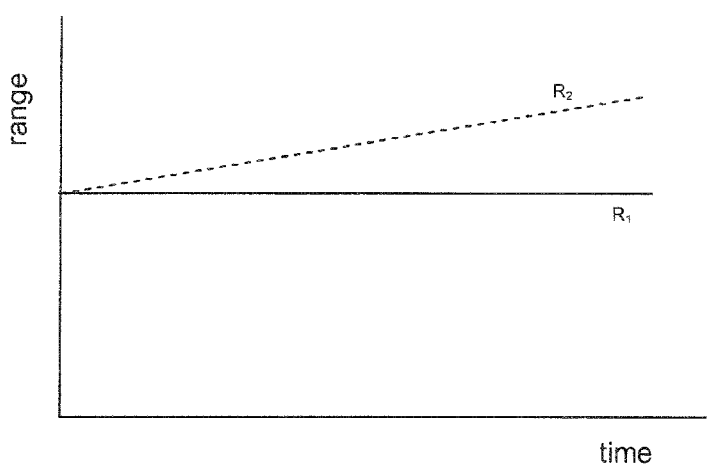
FIG. 9 illustrates a range consistency diagram for a wind farm.

FIG. 9 illustrates a schematic representation of a "track" of a wind turbine. The change in range determined directly from the range data, $R_1$, remains substantially static over time as no physical change is experienced by the wind farm/turbine. However, a Doppler value is returned to the radar such that a change in range $R_2$, based on the Doppler value does vary in some way, in this example it is illustrated as an increasing tendency. Consequently, the differences between $R_1$ and $R_2$ accumulate over time such that the $R_1$ line diverges from the $R_2$ line and the magnitude of the range consistency parameter, D, increases.

Figure 10:
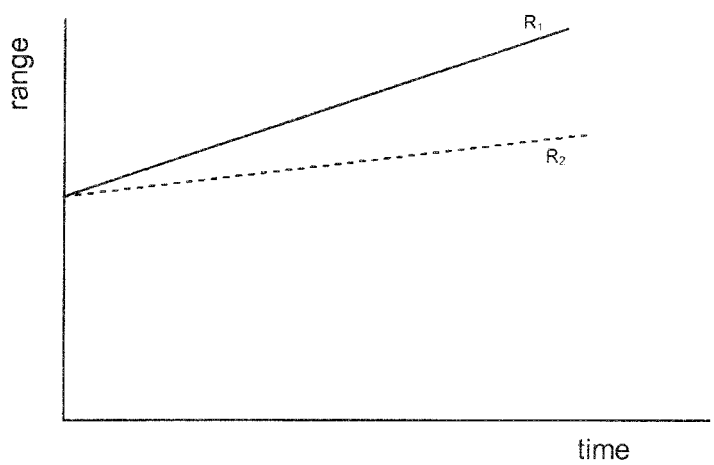
FIG. 10 illustrates a range consistency diagram for clutter.

In contrast, clutter present in the surveillance area is unlikely to remain at a fixed location. Co-located clutter, identified at consecutive time intervals (CIT), can be generated by quite remotely located incidents. However, due to the aforementioned errors associated with HF radar, these discrete incidents may be located 1-2 km away from one another and still be regarded as a potential coherent target. The change in range determined directly from the range data $R_1$ for this type of clutter varies accordingly, for example as illustrated in FIG. 10. It is highly likely that the change in range $R_2$, based on the respective Doppler values of each clutter return will not be consistent with that determined directly from the range data $R_1$. Indeed, the Doppler values associated with the clutter may be nil. Consequently, the $R_2$ line diverges from the $R_1$ line over time and the magnitude of the range consistency parameter, D, increases.

The graphs illustrated in FIGS. 8 to 10 are shown as straight lines, however, these simply represent the schematic trends, the actual data varies from the linear trace represented.

If D has a value of less than 2 the target can be considered to be genuine and is retained. If the value of D is greater than 4 the target is likely to be erroneous and can, therefore, be discarded or at least minimised. If, however the value of D lies in the range 2<D<4 then further track data is required to confirm the status of the apparent target so that it may be further categorised. The range consistency of the track can be established in four or five updates. If more data is available the results are more robust, preferably the data from 10 to 20 updates are used.

The locations of wind farms are known, however, there remains a need to track targets that pass close to or over or through these locations and so it is necessary to continue to monitor these locations to detect targets.

In practice, HF radar 'sees' a wind farm as a cluster of moving targets each potentially having an associated Doppler value. However, as each turbine does not actually move location, the tracks remain totally radial as no azimuth shift is detected. Any estimate of a related velocity vector remains radial with respect to the radar installation which, in itself, suggests that a non-genuine target is being detected.

The invention claimed is:

1. A process for reducing erroneous plots when detecting targets, the process comprising the steps of:
    obtaining range data from a high frequency surfacewave radar;
    obtaining radial velocity data from the high frequency surface radar; and
    processing the range and radial velocity data on a processor to perform the steps of:
        determining a first change in range of an apparent target based on the range data obtained in relation to a time period, associated with the apparent target;
        determining a second change in range of the apparent target based on the radial velocity data obtained in relation to the same time period, associated with the apparent target; and
        comparing the first and second range changes to one another over time to assess a consistency therebetween,
    wherein the comparing step is performed over a plurality of time periods and when the time periods are coherent integration times (CIT).

2. A process according to claim 1, wherein the erroneous plots emanate from a wind turbine.

3. A process according to claim 1, wherein the erroneous plots emanate from a wind farm.

4. A process according to claim 1, wherein the comparing step is performed over a plurality of consecutive time periods.

5. A process according to claim 4, wherein the comparing step is performed over between four and twenty time periods.

6. A process according to claim 1, wherein the comparing step comprises normalising a difference between the first and second changes in range to yield a range consistency parameter.

7. A process according to claim 6, wherein the comparing step comprises comparing the range consistency parameter to a threshold value to evaluate the range consistency of the apparent target.

8. A process according to claim 6, wherein the apparent target is discarded if the range consistency parameter is 4 or more.

9. A process according to claim 6, wherein the apparent target is considered to be a genuine target if the range consistency parameter is 2 or less.

10. A process according to claim 1, wherein the second change in range of the apparent target is obtained by integrating a radial velocity of the target indentified by the Doppler data.

11. A process according to claim 6, wherein said normalizing comprises normalising the difference between the first and second changes in range by their respective standard deviations.

* * * * *